Dec. 26, 1922.
H. MERCIER.
AUTOMOBILE AXLE AND SUSPENSION THEREFOR.
FILED AUG. 1, 1921.
1,440,022.
5 SHEETS—SHEET 1.
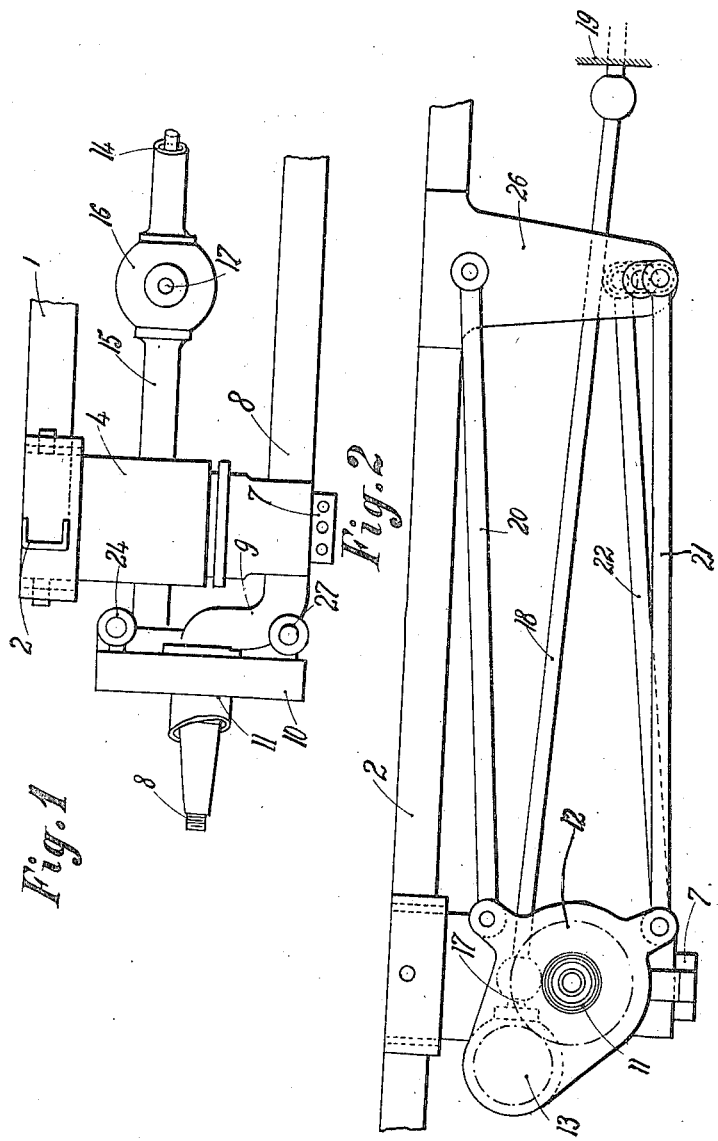
Inventor.
Henri Mercier
by Chas. J. O'Neill
Atty.

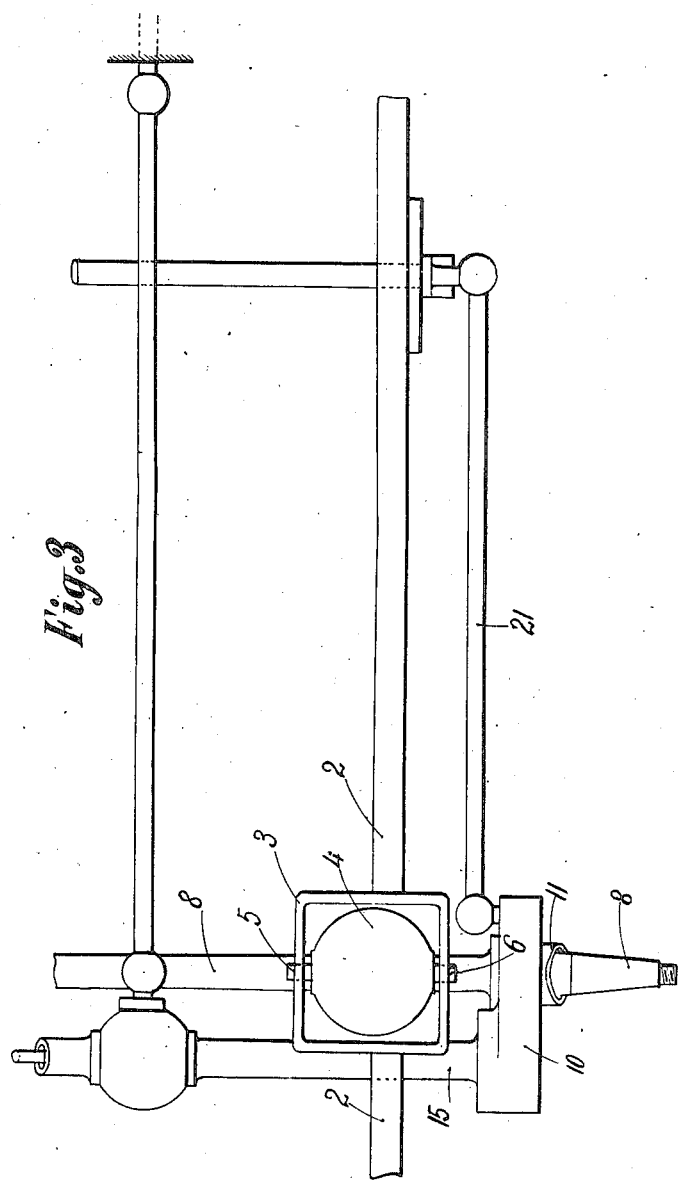

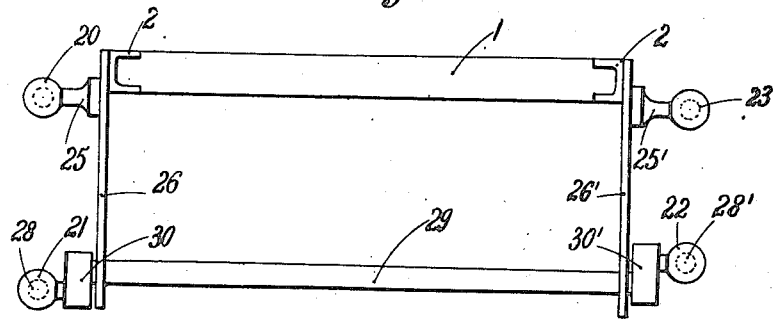
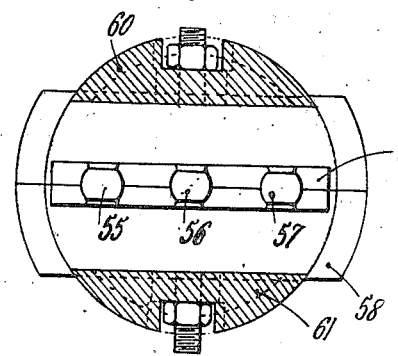
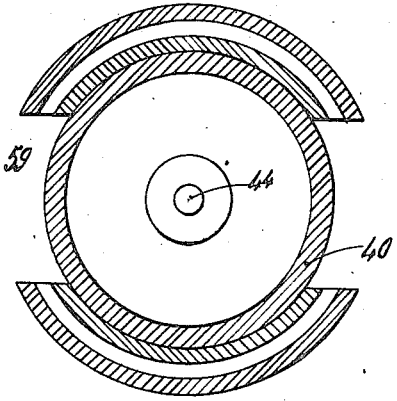
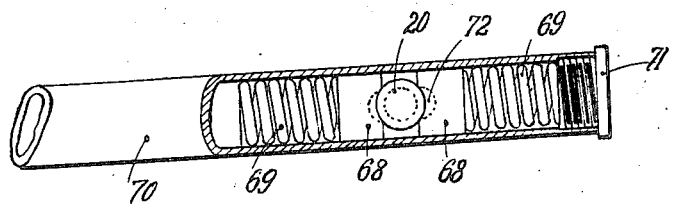

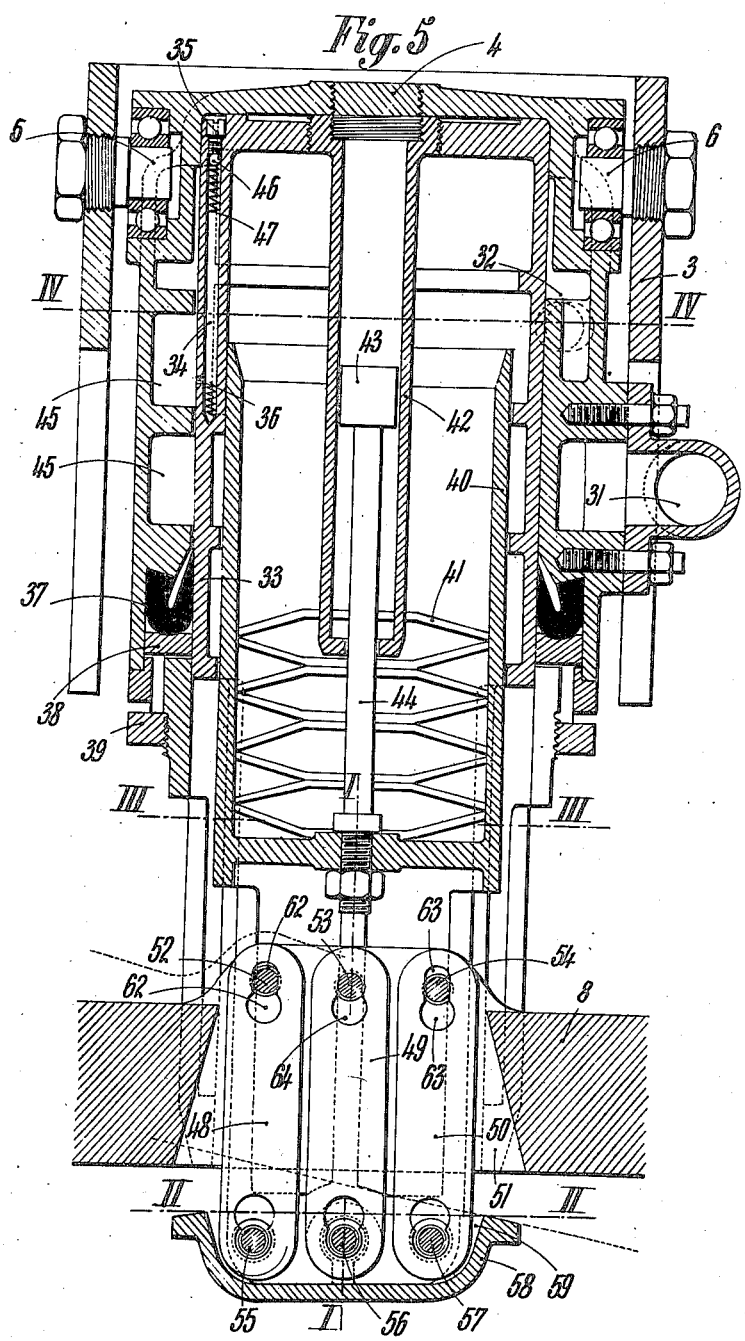

Dec. 26, 1922.
H. MERCIER.
AUTOMOBILE AXLE AND SUSPENSION THEREFOR.
FILED AUG. 1, 1921.
1,440,022.
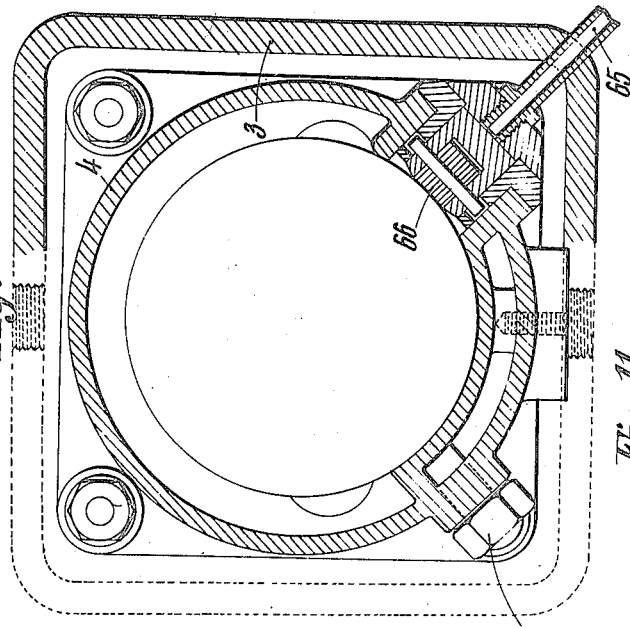
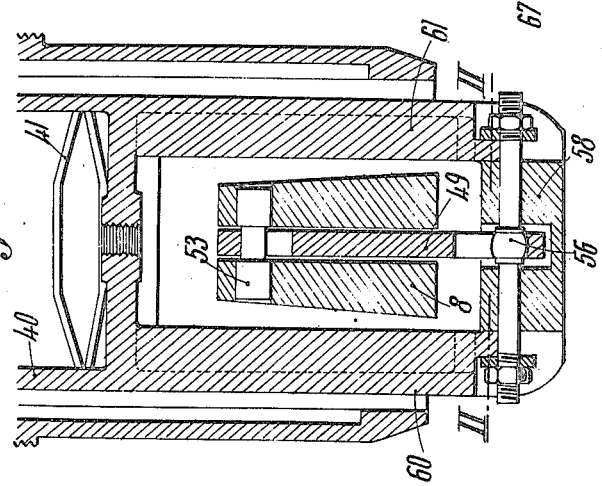
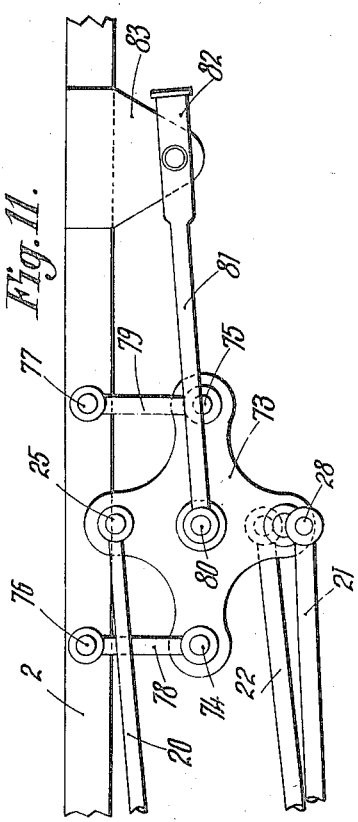

Patented Dec. 26, 1922.

1,440,022

UNITED STATES PATENT OFFICE.

HENRI MERCIER, OF PARIS, FRANCE.

AUTOMOBILE AXLE AND SUSPENSION THEREFOR.

Application filed August 1, 1921. Serial No. 489,019.

(GRANTED UNDER THE PROVISIONS OF THE ACT OF MARCH 3, 1921, 41 STAT. L., 1313.)

*To all whom it may concern:*

Be it known that I, HENRI MERCIER, citizen of the French Republic, residing at Paris, Department of the Seine, in France, and having P. O. address 6 Rue Foucault, in the said city, have invented certain new and useful Improvements in Automobile Axles and Suspension Therefor, for which I have filed an application in France dated November 24th, 1917; and I do hereby declare the following to be a full, clear, and exact description of the invention, such as will enable others skilled in the art to which it appertains to make and use the same.

The present invention has for its object an axle arrangement provided with composite or mixed suspension means more particularly intended for use in vehicles in which it is desired to have suspension means of great resiliency and flexibility as for example in ambulance vehicles intended for the transport of wounded or injured. The arrangement forming the subject matter of the present invention is formed by a pneumatic suspension means combined and adapted to function simultaneously with an arrangement of springs and buffers or shock absorbers so that in any case and whatever the rapidity and the frequency of the oscillations, the action of these buffers or shock absorbers cannot in any way interfere with the action of the pneumatic arrangement nor decrease nor affect the efficiency thereof.

According to the present invention a compensating arrangement is therefore provided which arrangement preferably concerns the two lower rods of the coupling connection and allows of the intermediate member being displaced longitudinally in one direction by a small amount when the other member tends to be displaced in the opposite direction.

In these conditions free pivotal movement of the axle is ensured in all circumstances, parallelism during displacements being retained in a most satisfactory manner and all injurious or dangerous excess tension to the various members is avoided.

The present arrangement has the advantage of being sufficiently correct in operation if in consequence of errors of assembly or mounting or application the rods do not form between them a strictly true parallelogram.

Pneumatic suspension arrangements of high resiliency or elasticity and large amplitude of jolt-displacements permit of moderate speeds and consequently in most cases the use of solid tires instead of pneumatic tires.

The pneumatic suspension employed in the invention may be of any suitable type but is preferably formed by a sustained pneumatic arrangement provided with a leakage regulator. The pneumatic suspension arrangement is provided with a plunger piston which is provided with fittings to allow of resetting for play and clearance and with oil lubrication which permits of perfect fluid tightness by clamping and also reduces friction to a minimum.

The spring suspension arrangement will be formed preferably by a pile of superimposed reversed cupped washers concentrically arranged relatively to the plunger piston of the pneumatic suspension arrangement which has the advantage of avoiding any accident in case of rupture of one or more than one of the washers, and capable by reason of its force and dimensions of being disposed in series with the pneumatic suspension. The articulation of the end of the plunger piston of the pneumatic suspension arrangement to the axle is formed preferably by an arrangement of transverse links arranged in pairs situated in a wedge shaped recess formed in the body of the axle. This arrangement is less cumbersome and forms a true damping or shock absorbing arrangement for lateral shocks and the addition of auxiliary twin links disposed as hereinafter explained, remedies to a great extent the effect of rolling arising from the high degree of elasticity or resiliency of the pneumatic suspension arrangement.

The compensating arrangement suitably displacing the ends of the axle is formed by an arrangement of two links constituting the lower part of each parallelogram coupling the axle to the chassis, the ends of which are connected together by means of a suitable link or rod of any kind the function of which is to impart to one of the links a movement opposite to that of the other link when the arrangement is deformed under the influence of unequal jolt-displacements of the ends of the axle.

In order that the invention may be clearly understood reference is made to the accompanying drawing which shows by way of example a constructional form in accordance with the present invention.

Figure 1 is a transverse elevation of the carrier axle, showing also the motor axle, the transmission gearing the suspension arrangement and the chassis.

Figure 2 is a side elevation of the same parts showing further the parallelogrammatic coupling arrangement and the compensating arrangement.

Figure 3 is a plan of the aforesaid parts.

Figure 4 is an elevation showing the points of articulation of the rods or links and the brackets supporting the compensating arrangement.

Figure 5 drawn to an enlarged scale is a vertical section of the composite arrangement showing the pneumatic suspension arrangement, the spring suspension and the absorber of lateral shocks.

Figure 6 is a vertical section in a plane perpendicular to that of Figure 5.

Figure 7 is a transverse horizontal section on the line II—II Figure 5.

Figure 8 is a cross section on the line III—III Figure 5.

Figure 9 is a cross section on the line IV—IV Figure 5 showing the cradle or saddle which encloses the suspension arrangement.

Figure 10 shows by way of example an elementary form of longitudinal buffer for shocks which is applied to the point of attachment itself of the rods or links forming the parallelogram.

Figure 11 is a view of a modification showing an arrangement of longitudinal buffer for shocks which buffer is interposed in the line of the coupling between the axle and the chassis. This improved arrangement discriminates between the forces, separating those due to thrust from those resulting from the reaction of the motor couple whilst still retaining the desired parallel effect of the displacements with respect to the axle.

All the figures show the composite arrangement of the suspension without compressed air, the pneumatic suspension being consequently non-inflated.

In Figures 1, 2, 3, 4 the transverse longerons of the chassis are indicated by the reference numerals 1 and the lateral or side longerons by 2. The latter are interrupted at a suitable part of their length to receive a cradle 3 or saddle of rectangular or square form, on which cradle or saddle is articulated a suspension pot or cylinder 4 adapted to pivot about a transverse horizontal axis in the bearing 5, 6. This arrangement of mounting in a cradle or saddle besides permitting of the necessary pivotal movements of the suspension pot or cylinder 4 facilitates the adaptation of the arrangement to any chassis. The longerons 2 whatever may be their distance apart and their height can always be fixed in a suitable position by suitable angle-irons or equivalent and bolts on the surfaces of the cradle 3 or saddle, which surfaces are intentionally provided of suitable dimensions sufficient to permit of the use of the arrangement on any chassis. The lower part 7 of the suspension arrangement rigid with the plunger-piston is articulated near the end of the carrier axle 8. This latter is bent as shown at 9 and is provided at its ends with symmetrical casings only one of which is shown at 10 which casings enclose the mechanism which transmits the movement to the driven hubs 11 mounted on the ends of the axle 8. The movement is imparted to these hubs by gearing 12 (Figure 2) engaging gearing 13 keyed on the shaft 14 of the motor axle 15. On account of this method of driving the hubs 11 from the shaft 14 of the motor axle, it is possible to obtain the necessary spacing apart of the motor and carrier axles so as to permit of the interposition of the suspension pot or cylinder 4 and also the necessary elevated position of the motor axle thereby facilitating the correct working of the cardan transmission. The casing for the differential gear shown diagrammatically at 16 is provided with a transmitter or driving shaft 17 to which is coupled the intermediate shaft 18 of the cardan articulated at 19 to the motor shaft. The motor axle 15 and the carrier axle 8 are rigid or integral at their ends with casings such as 10 which serve as casings for the transmission gear. Each of these casings is coupled to the chassis by means of rods or links 20, 21, 22 and 23. The rods 20 and 23 respectively articulated by the ball and socket joints 24 at the upper part of the casings 10 are connected to the fixed ball and socket joints 25 and 25' mounted on the brackets 26 and 26' rigid with the longerons 2. The rods or links 21 and 22 articulated at 27 at the bottom of the casings 10 are secured at their other ends to ball and socket joints 28 and 28' carried by two crank arms 30 and 30' connected together by a cross bar 29 which is pivotally mounted so that it can rotate. If the carrier axle be displaced vertically the rods 21 and 22 pivot about the axis 29 and the rods or links 20 and 23 pivot on the axis joining the centre of the supports 25 and 25' so that they form an articulated or jointed parallelogram.

Further, if one of the casings 10, for example be lowered whilst the corresponding and symmetrical casing is raised for any reason, the rod or link 21 is displaced towards the rear, for example, which causes the cross bar 29 to turn on itself and thus impart a forward movement to the rod 22 and to the casing symmetrically arranged with respect to the casing 10 which casing is attached to the other end of the motor axle. This movement is exactly equal to that which is necessary to avoid imparting any excess tension in the various parts irrespective of the bending or deflection of the suspension arrangement 4. The transmission to the hub from the Cardan shaft 18 is effected therefore much more easily than when the ordinary coupling arrangement is employed by reason of the almost constant parallelism maintained by the shafts 17 and 18 during the oscillations. The amplitude of the jolt-displacements of the carrier shaft 8 being often very considerable, the motor axle 15 will preferably be mounted towards the top so that the Cardan shaft 18 assumes the upwardly inclined position shown in Figure 2 when the vehicle in the absence of compressed air supplied by the pneumatic arrangement rests solely on the reversed cupped washer spring arrangement, which causes it to occupy an approximately horizontal position when the vehicle is running and when the suspension is fully operative. The mean steering angle of the intermediate shaft of the cardan 18 is thus reduced, since the latter oscillates about a horizontal position.

Figure 5. drawn to an enlarged scale shows in detail a vertical axial section through the suspension pot 4 or cylinder. This latter is articulated in bearings 5, 6 in the cradle or saddle 3 preferably provided with bushes and ball bearings. The cradle or saddle 3 is dimensioned and so arranged that it can be secured to the longerons of any vehicle irrespective of the width and height of the vehicle in question.

The pneumatic suspension indicated is of the fed type provided with a leakage regulator and a damping chamber adapted to be evacuated at any part of the stroke of the plunger-piston. Communication with the damping chamber (not shown) is effected through a passage 31 leading into an annular chamber 32 surrounding the plunger-piston 33. In the wall of the piston 33 is a passage 34 which is closed by a screw 35 having at one end an axial bore and at the other end an opening 36 forming a leakage regulator. The end of the suspension pot or cylinder 4 is provided with a leather or equivalent packing 37, the tension or pressure of which can be regulated by means of a ring 38, which can be manipulated by hand and a further ring 39 adapted to engage a screw threaded part of the suspension pot or cylinder 4 which ring 39 can be rotatably adjusted thereon. When the opening 36 by reason of the displacement of the plunger-piston descends below the level of the leather packing 37, the space above the piston is placed in communication with the atmosphere thus allowing the compressed air to escape to the atmosphere. The spring suspension arrangement is then interposed between the plunger-piston 33 and the pneumatic suspension and a piece 40 slides in the interior of the said piston. The effect of this arrangement is to ensure complete responsive action of the pneumatic arrangement even to the highest frequencies irrespective of the moving mass of the plunger-piston and consequently of procuring for the arrangement a maximum sensitivity to all conditions of the route whatever its nature. The resilient spring arrangement is formed by a series of reversed superposed cupped washers shown at 41 resting on the base of the inverted telescoping cylinder 40 and abutting against the upper interior face of the member 33. Only a few of the washers are shown, but it is to be understood that they extend from end to end of the cylinder. The use of these washers in this particular instance has very important advantages. By reason of their reduced volume they can be disposed concentrically in the interior of the pneumatic suspension arrangement and in case of destruction or wear of any one of them the remaining washers still remain operative as springs and act to support the load. The guiding of the cupped washers centrally of the piece 33 is effected by means of a socket 42 which serves at the same time as a guide to a piston 43 mounted on a rod 44 rigid with the base of the part 40 and intended to limit the collapsible or closing movement of the cupped spring washer arrangement. Lubrication is effected by means of oil enclosed in the compressed air annular chambers 45 surrounding the piston. The piston therefore constantly operates in a bath of oil which facilitates its movement and prevents any jamming or wedging action. With the object of avoiding the entry of the oil into the passage 34 through the opening 36 when this latter opening is clear of the oil bath, use is made of a spherical valve 46 adapted to be retained against the opening in the screw 35 by a spring 47. The compressed air contained in the tube 34 is therefore imprisoned and prevents the oil from penetrating therein, the escape of the air to the atmosphere being effected freely as soon as the orifice descends below the level of the leather packing 37.

The articulation of the lower part of the piston 40 with the carrier axle 8 is effected by means of twin links 48, 49 and 50 (see Figures 5, 6, 7 and 8) situated in wedge-shaped recesses 51 in the carrier axle 8. These links respectively surround or enclose the axes 52, 53 and 54 and they pass through a wedge-shaped recess in the carrier axle their lower ends being connected with the axes 55, 56 and 57 secured to a suspension piece 58 having a space 59, which piece 58 is wedged between two lateral jaws 60 and 61 formed as an extension of the piston 40. The axis 56 is disposed in such manner as to be operated through the bolts at the extremities of the lateral jaws 60 and 61. Normally, only the link 49 supports the weight of the vehicle, the holes or spaces 62 and 63 receiving the axes 52 and 54 of the links 48 and 50 being slightly extended above the top of the space 64 in the link 49. If the vehicle tends to swing laterally to one side or the other, that is to say, if it be subjected to rolling, the fixed suspension on the chassis is inclined towards the right or towards the left and its axis is no longer perpendicular to the carrier axle 8. The link 49 then ceases to carry the load and it is the adjacent link 50 and its axis 54 for example which replaces it. The plunger 40 of the suspension arrangement is no longer supported on the axis 56 but on the axis 57. The resilient reaction of the suspension arrangement is no longer axial and tends to restore the chassis into its normal position.

This arrangement of coupling the axle by transverse twin links to the suspension arrangement also permits the movements and deformations necessary for the independent play of the suspension when the deflections are unequal and constitutes under gravitational control a true transverse buffer or shock absorbing arrangement which absorbs the lateral shocks to which the wheels are subjected during the running of the vehicle.

In Figure 9 at 65 is shown the outlet opening for the feed of compressed air to the suspension arrangement.

In section, Figure 10, is shown in detail one of the ball and socket joints for the rods or links of the parallelogram. This ball and socket joint is disposed between two gripping blocks 68 having concave recesses in their adjacent faces adapted to engage the spherical part of the ball of the joint and forced against the ball by springs 69 disposed in the tubular end of the rod and maintained therein by the screwed plug 71. The ball is pivotally mounted in the rod by means of an oval opening 72 in which it can play the necessary amount by compressing the springs 69 under the action of forces acting on the rods or links. The longitudinal shocks are transmitted thereto by displacement of the ball in the opening 72. This arrangement is somewhat analogous to the arrangement at present employed for the steering rods of automobile vehicles. Nevertheless the balls are not adapted for movement through any great angle as in the present application and the springs are much more powerful. A similar buffer or shock absorber arrangement is disposed at one of the ends of each rod.

This construction does not provide for an efficient absorbing or damping of longitudinal shocks and according to the direction of the forces it follows that each of the rods is subjected sometimes to the sum and sometimes to the differences of the pressures resulting at any one time to the thrust and reaction of the motor couple.

The variation of forces applied to the springs is therefore considerable and these latter being capable of the maximum resistance lack the necessary resiliency or elasticity when the pressure becomes reduced to the minimum. On the other hand the cushioning stroke or damping stroke must be considerably reduced, otherwise there would result important displacements or vibrations in the parallel movements it is desired to impart to the axle.

The arrangement of Figure 11 avoids these inconveniences. In this Figure, 20, 21 and 22 represent the balls or links similar to the same parts of Figure 2, the lower rods or links being provided with their compensating rod. The balls 25 and 28 are fixed to a metal sheet 73 carrying two axes 74 and 75. Two other axes 76 and 77 are fixed to the longeron 2 of the chassis. These axes 74 and 76 and 75 and 77 are connected in pairs by auxiliary rods or links 78 and 79 forming an articulated or jointed parallelogram. A ball 80 at the centre of the metal sheet is rigidly connected to the chassis by the rod 81 which ends in a buffer device 82 analogous to that previously described with reference to Figure 10 and fixed to the chassis by a bracket 83.

The action is as follows:—

Under the action of the motor couple and the differences of pressures exerted by the rods 21 and 20 resulting therefrom the metal sheet tends to turn about the centre 80. It is prevented from so doing by the rods 78 and 79 which transmit thus directly to the chassis the reaction of the couple. With regard to the thrust whether positive or negative, it is transmitted as a pressure or a tension to the rod 81. The whole arrangement can therefore be displaced parallel to itself while acting on the buffer 82 and turn about the centre 76 and 77 by any necessary amount, without the conditions of parallelism being modified. Further, the power required for the springs of the buffer or shock absorber 82 is found to be exactly that necessary or required for the thrust.

The invention is more particularly intended to be applied to the motor Cardan axle of road vehicles in which it is desired to have a delicate springing arrangement but it is also applicable to axles driven by chains and to the steering axles of the same vehicles and it should be understood that the invention is not limited to this or any class of vehicle. It may equally as well be applied to railway wagons, railway carriages, tramways, etc.

The invention has for its object an axle arrangement with composite suspension end buffers, shock absorbers, or damping arrangements for absorbing transverse and/or longitudinal shocks capable of being adapted to any chassis and permitting of obtaining great resiliency whilst retaining quickness and responsiveness in action irrespective of the rapidity of the oscillations thereby giving great security against rolling and reducing to a minimum the risks of accidents in case of displacement of the springs and facilitating the action of the transmission to a highly satisfactory degree.

It is characterized by the following points considered separately or in combination:

1. In a vehicle suspension, the combination with motor and carrier axles, the former being arranged and displaced relatively to the latter, of a suspension pot or cylinder for connecting the carrier axle to the chassis, a cradle or saddle rigid with the side frames of the chassis providing a bearing in which said cylinder is adapted to oscillate, intermeshing gears interposed between the motor axle and the carrier axle, and connected respectively to each, and a housing for said gears, said housing being adapted to oscillate in unison with the cylinder about its bearing in the cradle.

2. The combination as covered in claim 1, said pot or cylinder consisting of a suspension arrangement to which compressed air is adapted to be fed, a leakage regulator in said cylinder, a shock absorbing or buffer chamber evacuated at a certain point of the stroke of the piston, a plunger-piston for the suspension arrangement slidably mounted within said first mentioned cylinder, an inverted cylinder slidable in said plunger-piston, a resilient spring arrangement formed by superposed reversed cupped washers, and a base extension carried by said inverted cylinder articulated to the carrier axle.

3. The combination as covered in claim 1, said pot or cylinder consisting of a suspension arrangement to which compressed air is adapted to be fed, a leakage regulator in said cylinder, a shock absorbing or buffer chamber evacuated at a certain point of the stroke of the piston, a plunger-piston for the suspension arrangement slidably mounted within said first mentioned cylinder, an inverted cylinder slidable in said plunger-piston, a resilient spring arrangement formed by superposed reversed cupped washers and a base extension carried by said inverted cylinder, a series of upper and lower rods and interconnecting links forming a jointed or articulated arrangement connecting said base extensions to the chassis, a centrally pivoted bar carried by the base extension of said inverted cylinder in which the lower rods are mounted, whereby the direction of displacement of one of said links is opposed relatively to the direction of displacement of the other.

4. The combination as covered in claim 1, said pot or cylinder consisting of a suspension arrangement to which compressed air is adapted to be fed, a leakage regulator in said cylinder, a shock absorbing or buffer chamber evacuated at a certain point of the stroke of the piston, a plunger-piston for the suspension arrangement slidably mounted within said first mentioned cylinder, an inverted cylinder slidable in said plunger-piston, a packing for said plunger piston comprising a washer frictionally arranged against the walls of the piston, a regulating locking ring for said packing manually adjustable, a further ring screwed thereon and adapted to screw more or less onto a corresponding threaded part of the suspension pot or cylinder and means for connecting said cylinder to the carrier axle.

5. The combination as covered in claim 1, said pot or cylinder consisting of a suspension arrangement to which compressed air is adapted to be fed, a leakage regulator in said cylinder, a shock absorbing or buffer chamber evacuated at a certain point of the stroke of the piston, a plunger-piston for the suspension arrangement slidably mounted within said first mentioned cylinder, an inverted cylinder slidable in said plunger-piston, a resilient spring arrangement formed by superposed reversed cupped washers and a base extension carried by said inverted cylinder, three pairs of links situated in a wedge-shaped recess in the axle, three axes of suspension partly supported therein and partly by the axle, the holes in the outside links receiving the axes being extended above the top of the top space or hole in the middle link, whereby the outside links will intervene only when the body of the vehicle becomes laterally inclined to one side or the other, so as to oppose rolling, further forming a buffer or shock absorber for lateral shocks.

6. The combination as covered in claim 1, and substantially parallel longitudinal members connecting the housing to the chassis comprising a cushioning arrangement for longitudinal shocks.

In testimony whereof I affix my signature.

HENRI MERCIER.

Witness:
ALEXANDRE BERTHOLLI.